United States Patent [19]

Ando et al.

[11] 4,337,533
[45] Jun. 29, 1982

[54] FRONT LOADING TYPE RECORD PLAYER

[75] Inventors: Ryuta Ando; Kazumi Kinugawa, both of Tokyo, Japan

[73] Assignee: Kabushiki Kaisha Aiwa, Tokyo, Japan

[21] Appl. No.: 182,178

[22] Filed: Aug. 28, 1980

[30] Foreign Application Priority Data

Sep. 7, 1979 [JP] Japan .................................. 54-114936
Sep. 13, 1979 [JP] Japan .................................. 54-117639

[51] Int. Cl.³ ....................... G11B 17/04; G11B 23/02
[52] U.S. Cl. ....................................... 369/77; 360/86; 369/264; 369/265; 369/271

[58] Field of Search ................. 369/77, 264, 265, 271, 369/191, 194; 360/97, 133, 86

[56] References Cited

U.S. PATENT DOCUMENTS 2,508,845  5/1950  Thompson ........................... 369/77
3,845,502  10/1974  Paus .................................... 360/97
4,272,794  6/1981  Skarky .............................. 360/133

Primary Examiner—Steven L. Stephan
Attorney, Agent, or Firm—Jordan and Hamburg

[57] ABSTRACT

A front loading type record player comprises a first and a second turntable, the second table being slidably detachable from the first table, and a means for outwardly feeding the second table from the record player frame.

17 Claims, 29 Drawing Figures

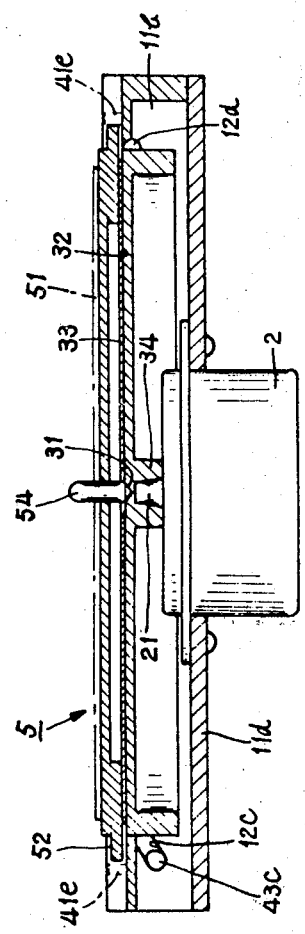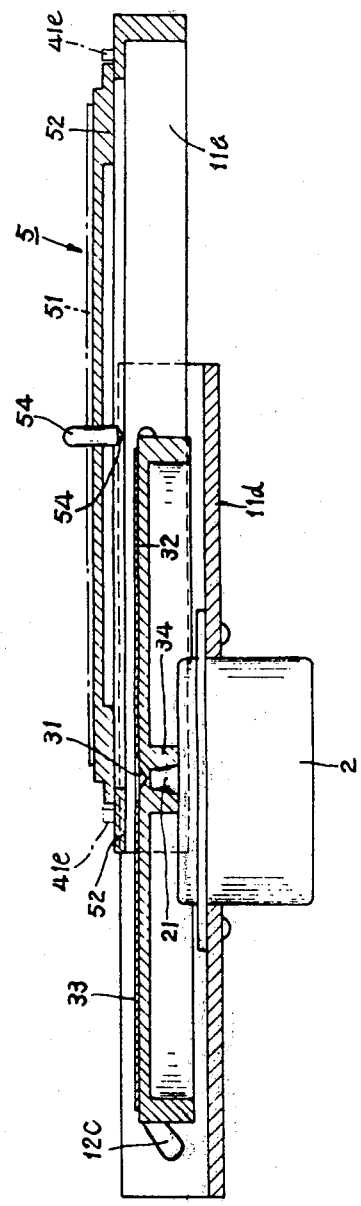

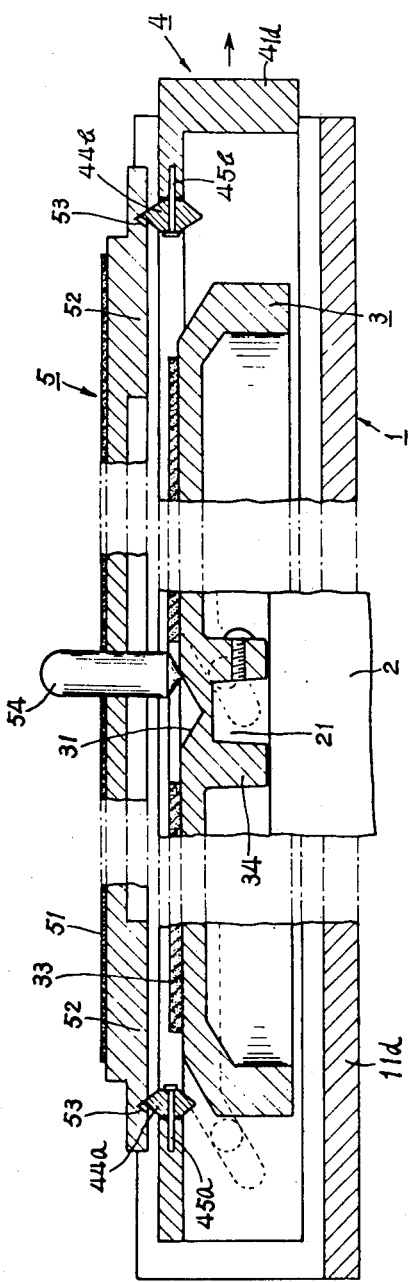
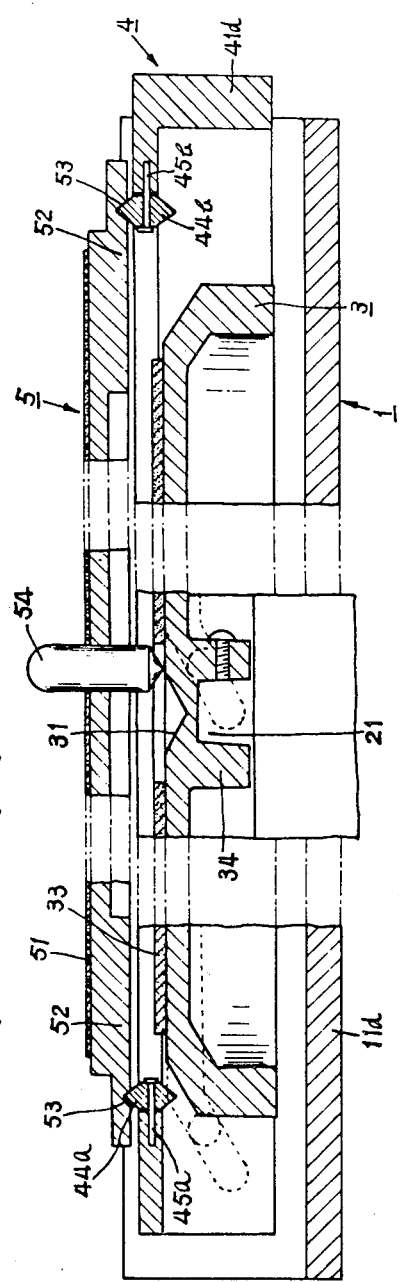
FIG. 4(c)
FIG. 4(d)

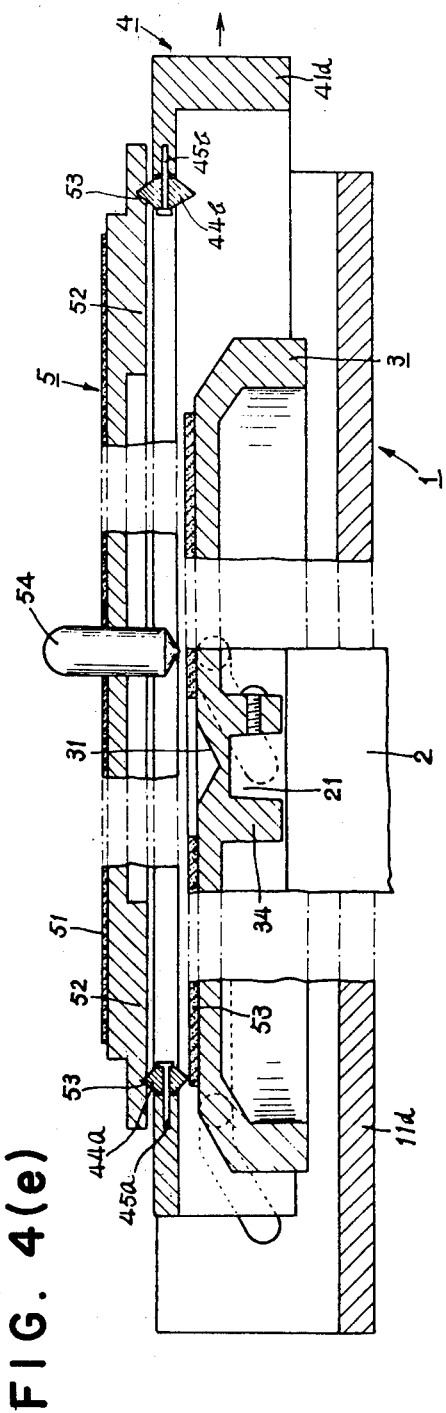
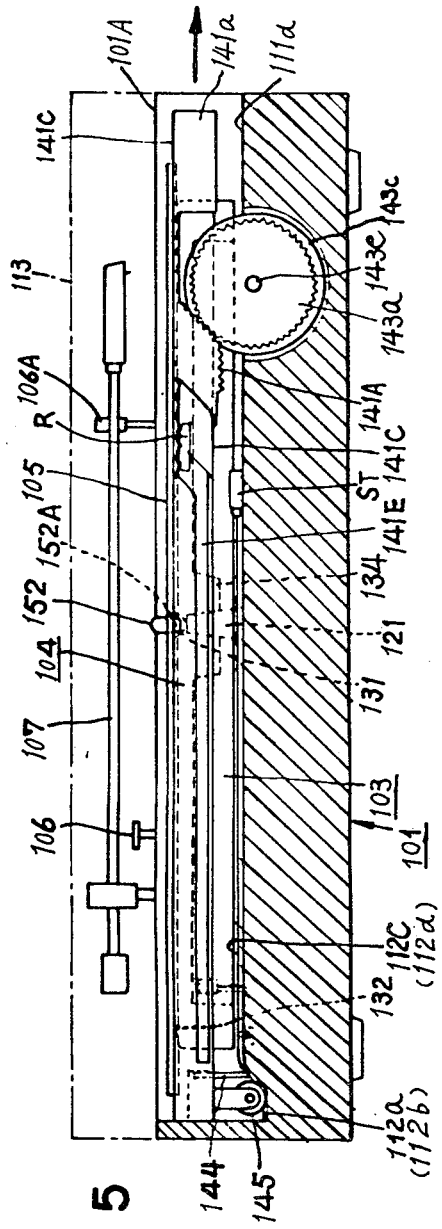
FIG. 4(e)
FIG. 5

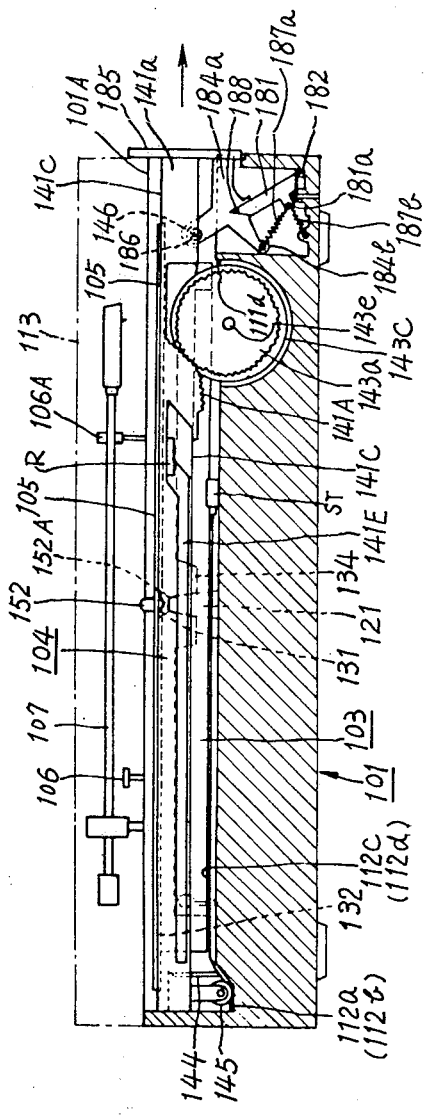
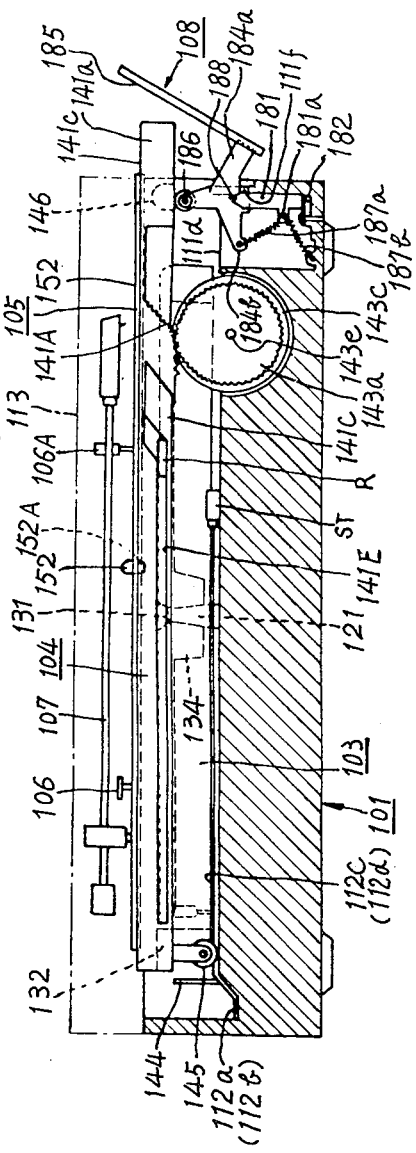

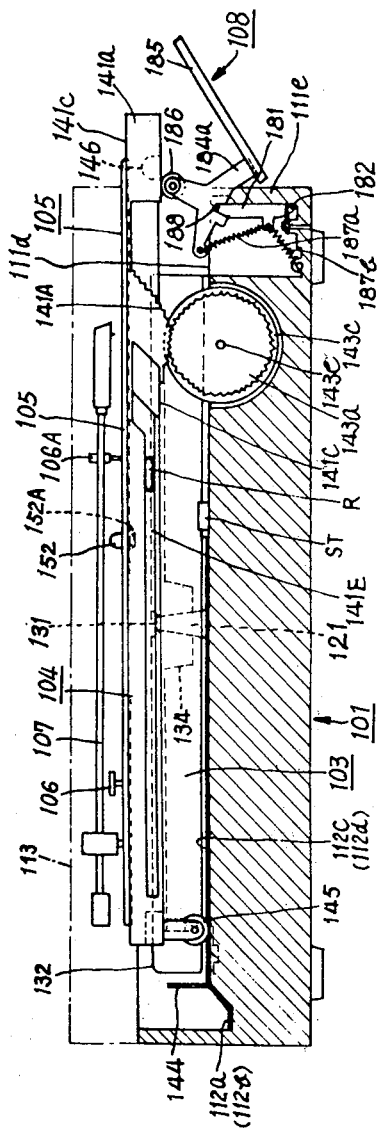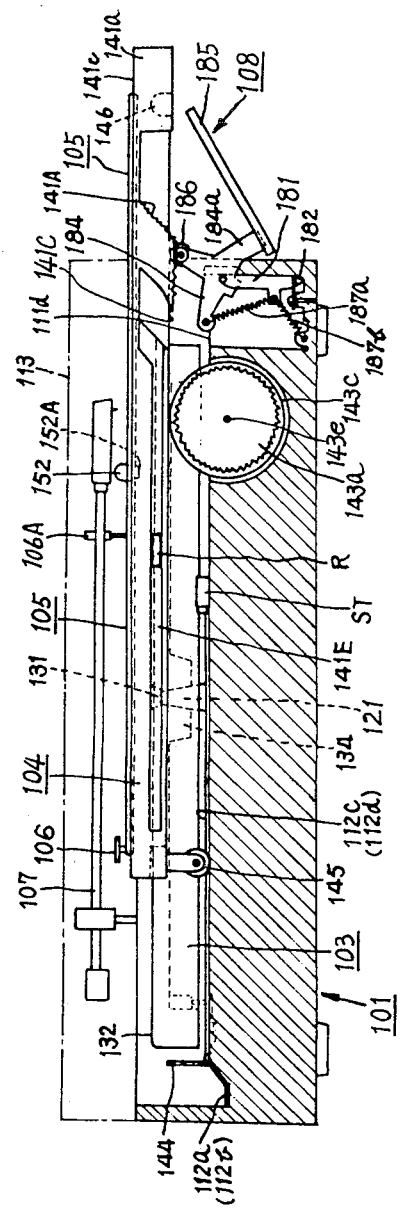

FRONT LOADING TYPE RECORD PLAYER

BACKGROUND OF THE INVENTION

1. Field of the Invention

This invention relates to a front loading phonogram record or disk player containing a slidable turntable for loading a record thereon, the slidable table being drawnout from the player frame so that the record is exchanged for another one thereon or replaced therefrom, and then inserted therein.

2. Description of the Prior Art

As known, since the conventional disk player includes a dustproof cover which can be opened and closed about hinges and a turntable for loading or placing the record thereon, whereby manual operations, placing or replacing of the records, exchanging the records, etc, are manually made, nothing is placed on the dust cover which has a plane flat surface. Thus the player should be placed at the top of the stack of an amplifier, a preamplifier and tuners and/or other devices, or access space should be retained for opening the cover between it and a ceiling plate below an upper shelf of the rack in which all the devices have been placed, these being all the drawbacks of the conventional players.

SUMMARY OF THE INVENTION

This invention provides a novel and useful device to overcome all such drawbacks.

A primary object of this invention is to provide a front loading record player comprising a first turntable and a second turntable which is detachable from the first table and for placing a record thereon, the second table being designed to be slidably drawout outwardly and forwardly from the player frame and to permit placing or replacing and/or exchanging the record.

Another object of this invention is to provide a record player comprising a first turntable and a second turntable for placing a record thereon, the second table being detachable from the first table and a driving control means for feeding the second turntable from the first table and outwardly from the player frame.

A still further object of this invention is to provide a front loading record player having a construction as described above and also an improvement which comprises a control means for translating or displacing a pickup arm holding the arm at a non-operative (outplay) position prior to the slidable movement of the second table, and bringing the arm to a playing position when the second table is coupled to the first table.

A still further object of this invention is to provide a front loading record player comprising a first turntable and a second turntable detachable from said first table, a driving control means for slidably feeding the second table outwardly from the player frame, and a means for opening and closing a cover plate provided at a front plate opening of the player frame relative to said driving control means when a supporting plate bearing the second turntable is fed out and inserted into the player.

A still further object of this invention is to provide a front loading record player of the type described above which also has an improvement comprising a means for translating a pickup arm which holds the arm at a non-operative position prior to the slidable movement of the second table, and which brings the arm to its in-play position when the second table rests or is loaded on the first table.

Yet another object of this invention is to provide a front loading record player to permit an easy positioning or accommodation of the record at its in-play position such that when the record is placed on the second table when the table is outwardly fed from the player frame, the record is placed slidably at its periphery following along each arch-like or arcuate opening at the upper portion of the front cover and the front plate opening of the dustproof cover.

BRIEF DESCRIPTION OF THE ACCOMPANYING DRAWINGS

FIGS. 1(a),(b) through 4(a)-(e) show a first embodiment of this invention, wherein FIG. 1(a) is a perspective outside view of the second table being drawnout from the player frame;

Figure 6A:
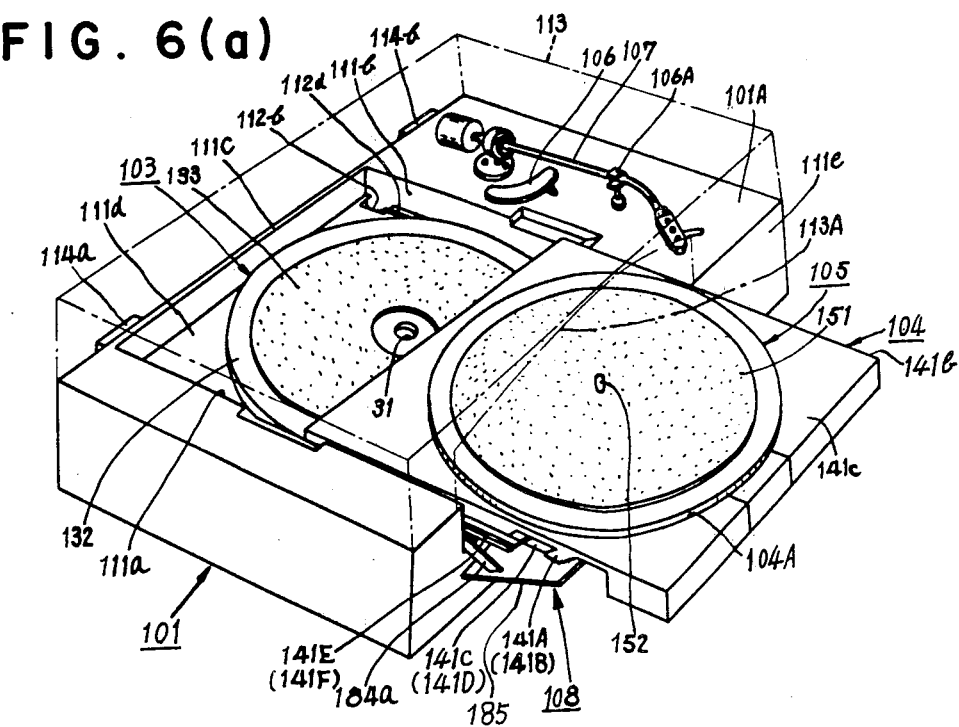
Figure 6B:
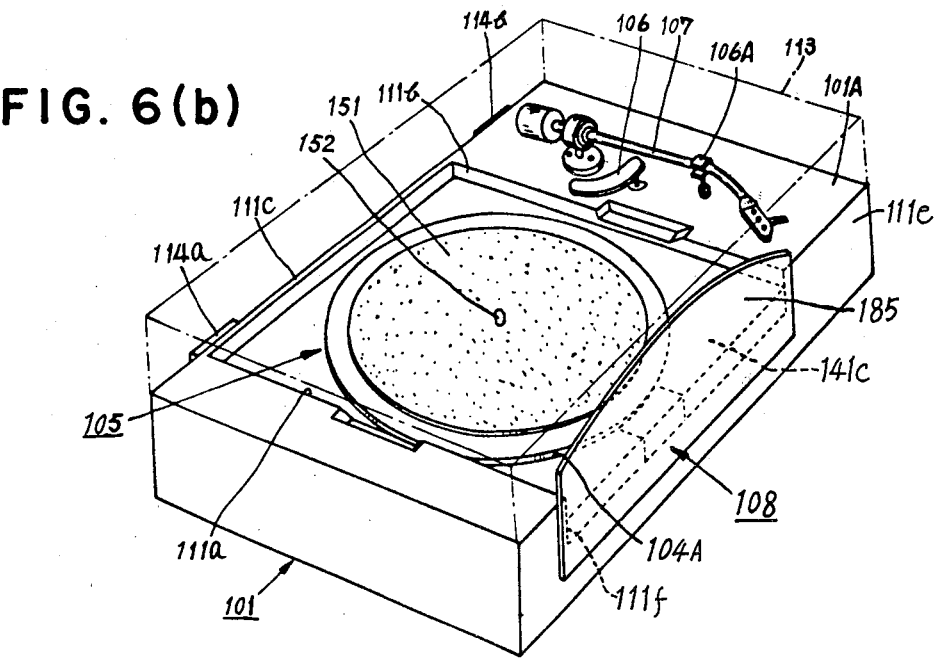
Figure 7A:
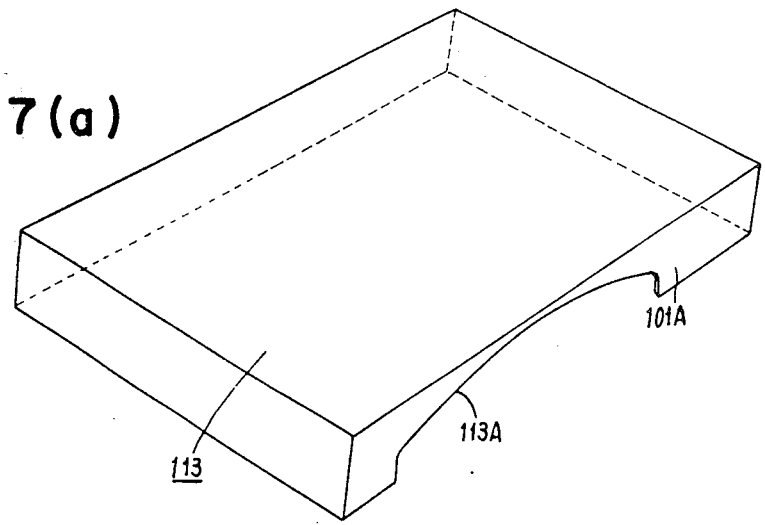
Figure 7B:
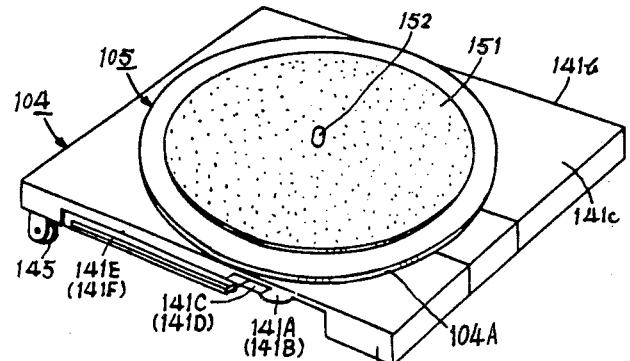
Figure 7C:
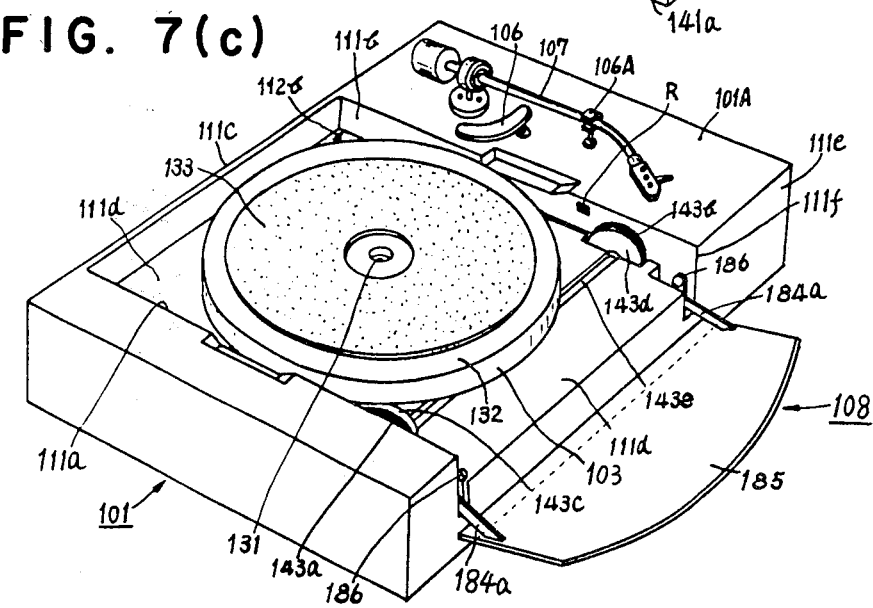
Figure 8A:
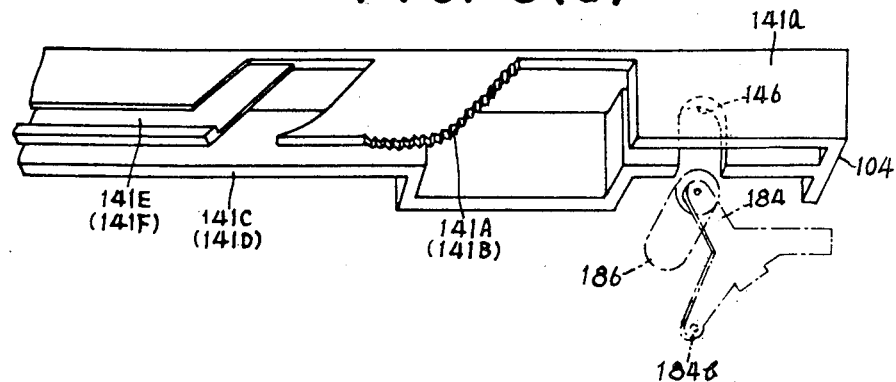
Figure 8B:
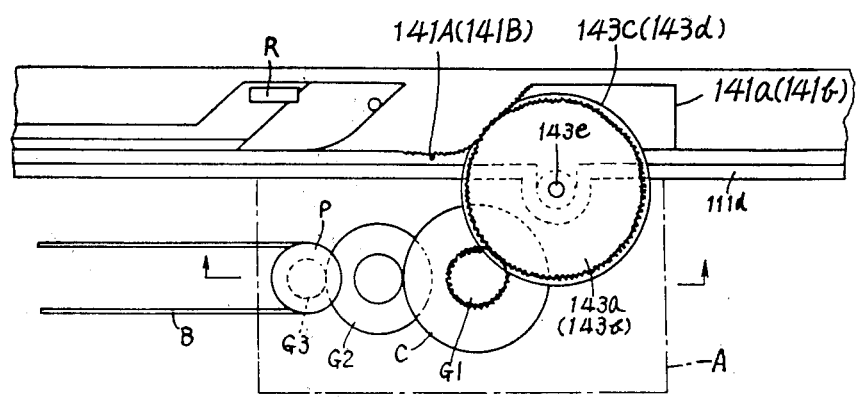
Figure 8C:
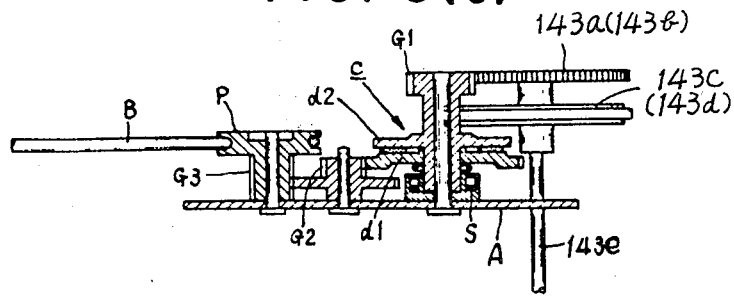
Figure 10:
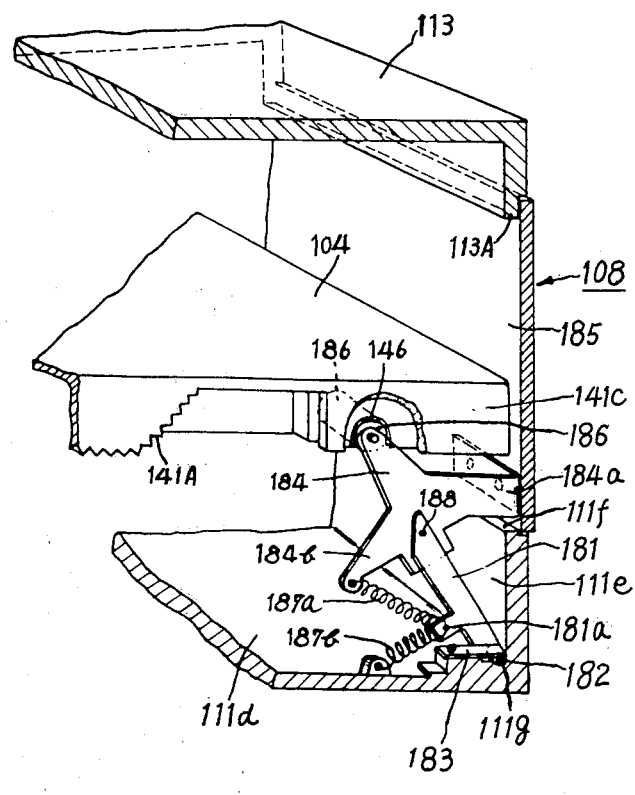
Figure 11A:
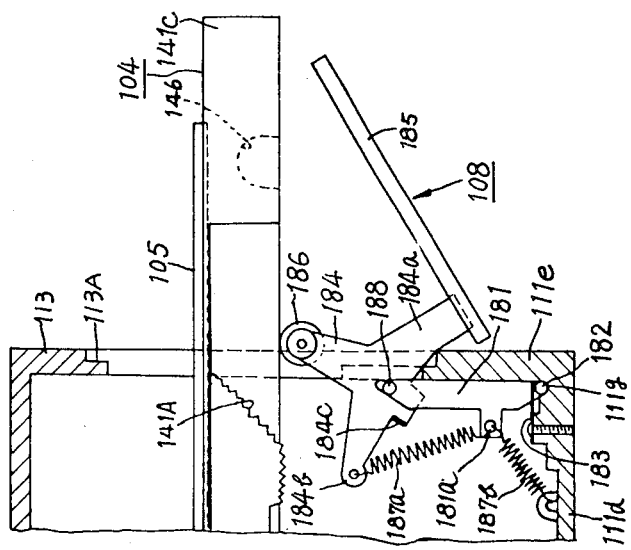
Figure 11B:
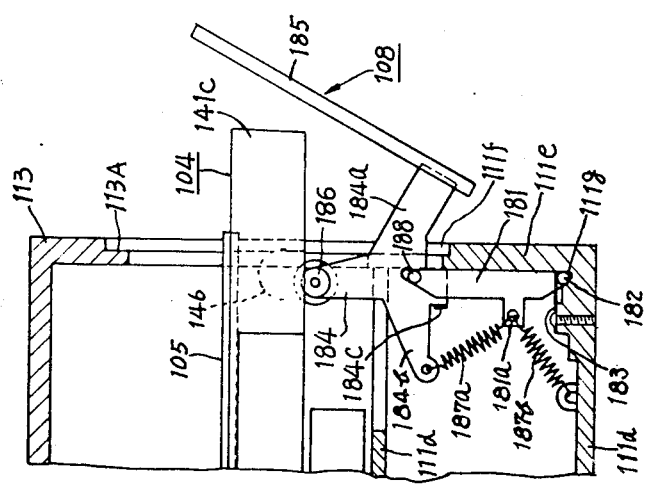
Figure 11C:
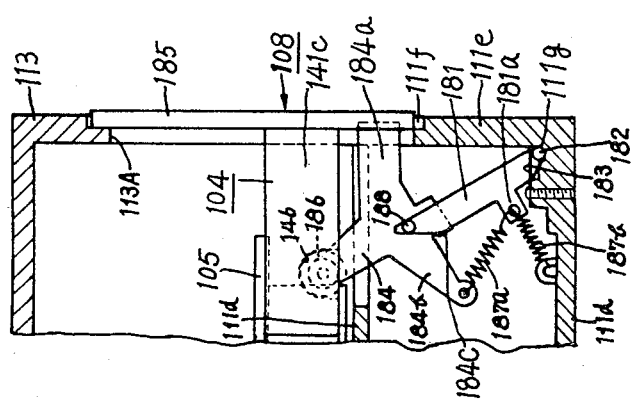

FIG. 3(a),(b) are cross sectional longitudinal views of the player;

FIGS. 4(a)-(e) are procedural views of the unloading or loadingout of the second table from the first table;

FIG. 5 is a side longitudinal view showing a translation means for a supporting plate in a second embodiment;

FIGS. 6(a),(b) through 12 show a third embodiment to sixth embodiment wherein:

FIG. 6(a) is a perspective view of the outside of the second turntable which has been fed outwardly from the player frame;

FIG. 6(b) is a perspective view of the second table which has been inserted or loaded into the player frame;

FIGS. 7(a)-(c) are perspective view of the disassembled player showing the player frame mounted with the first table and the supporting plate mounted with the second table;

FIGS. 8(a)-(c) are structural views of portions of the player;

FIGS. 9(a)-(e) are procedural views of the slidable loading and unloading of the second turntable on and from the first table;

FIG. 10 is a perspective view of a portion of the cover means;

FIGS. 11(a)-(c) are explanatory views of the operation of the cover means; and

Figure 12:
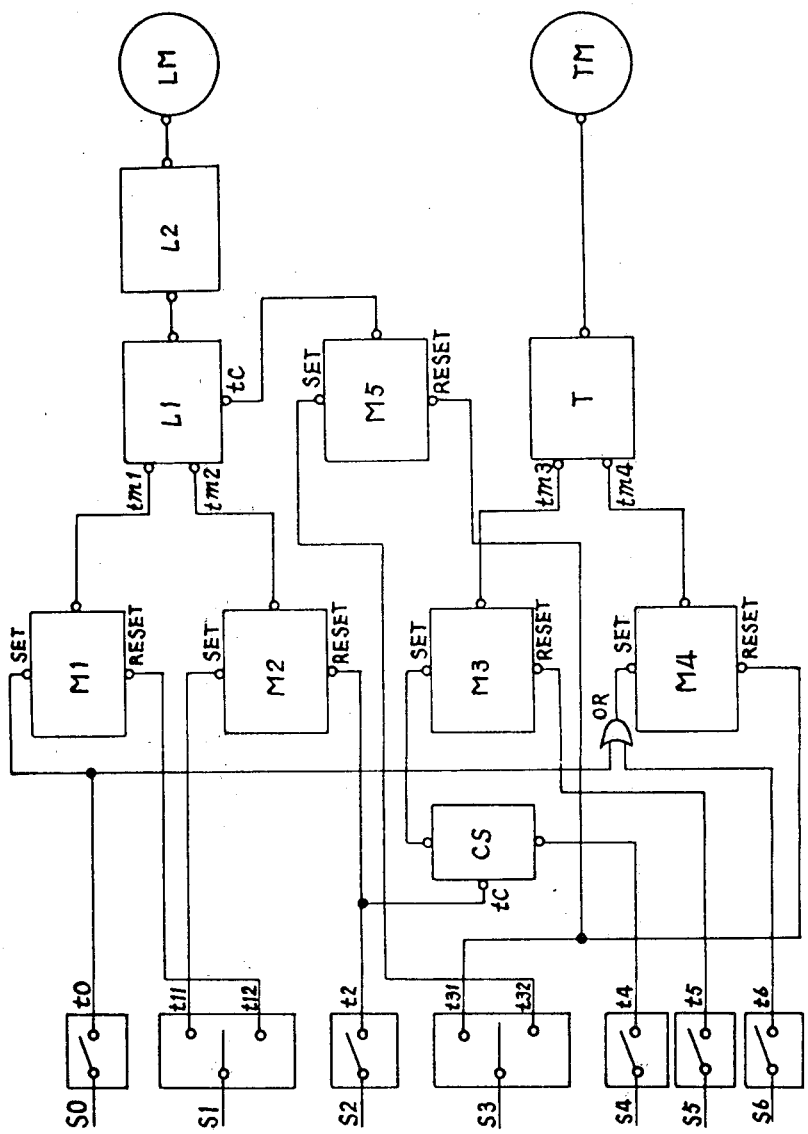

FIG. 12 is a sequence diagram showing the translating control means for the supporting plate and a control means for translating the pickup arm of the second through fifth embodiments of this invention.

The preferred embodiments of this invention will now be hereinafter discussed with reference to the accompanying drawings.

Figure 1A:
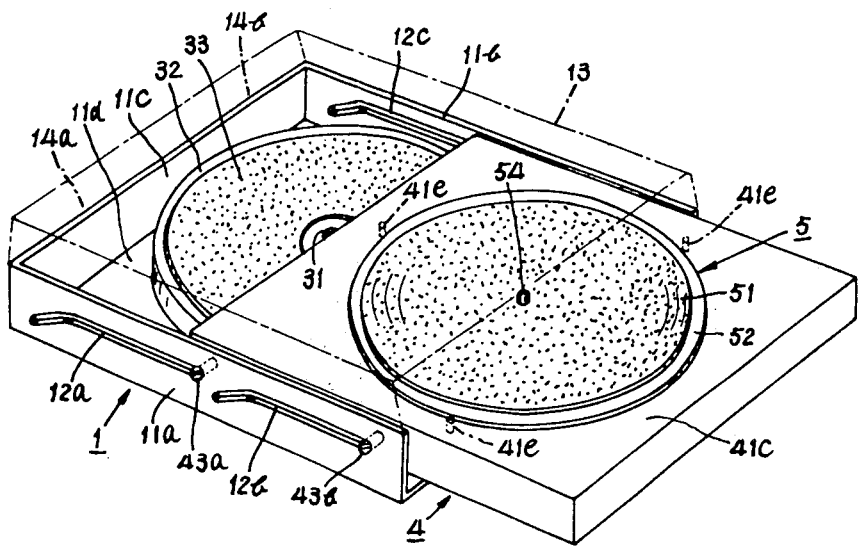
FIG. 1(b) is a perspective outside view of the second table which is insertable within the player frame.
Figure 1B:
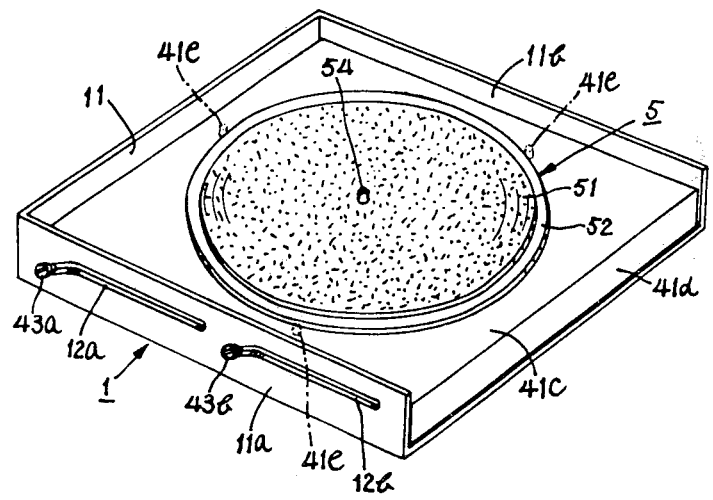
Figure 2:
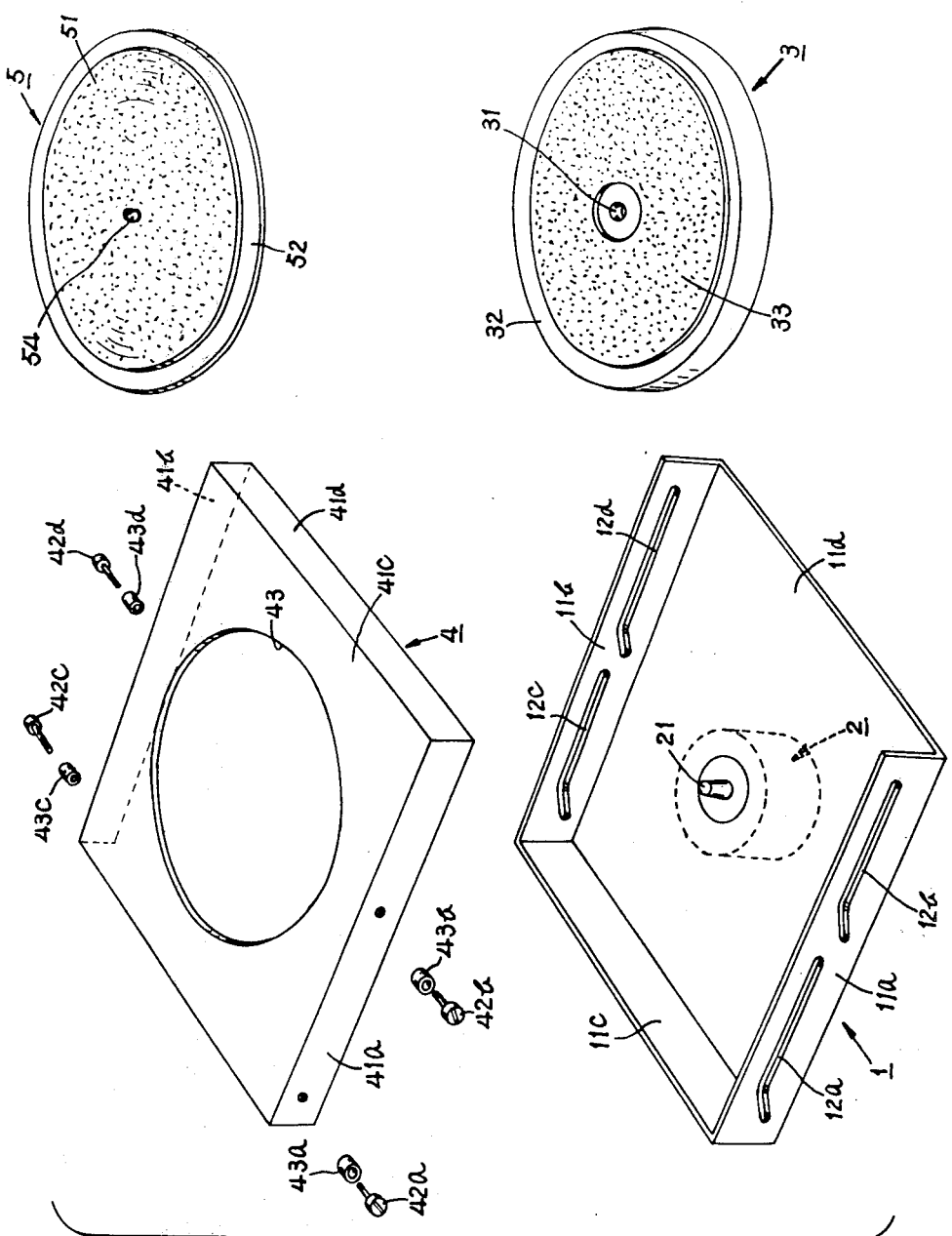
FIG. 2 is a perspective view of the disassembled second table.

The first embodiment will be discussed as follows. FIGS. 1(a),(b) are perspective views of two turntables of this invention, wherein a second turntable 5 is uncoupled or unloaded from a first turntable 3, on one hand, and on the other hand, the second table 5 is loaded on the first one 3. FIGS. 2 and 3(a),(b) show the player frame 1 with front and an upper surfaces both open, securely fixed with a direct-driving motor discussed later, and the first table, etc. Provided on its side wall plates 11a, 11b, in parallel, are a plurality of grooves 12a—12d, respectively which run at generally 35° at the one end and then in parallel with the bottom plate 11d toward the other end so as to lift up the supporting plate frame 4 discussed later for a certain height, mounted with the second table and then to slidably and horizontally feed it for a certain distance. Attached on the rear side plate 11c with hinges 14a, 14b is a Justproof cover 13 formed of transparent and/or translucent plastic materials as shown in dotted lines.

Provided on the bottom surface 11d of the player frame 1 are a motor 2 and a motor control circuit and a motor driving circuit, a detection circuit for detecting revolution speed (r.p.m.) of the motor, etc., (not shown). Provided on a shaft 21 of the motor at its upper center is an engaging hole 31 having a conical inclined face of 35° for receiving and engaging a conical center pin of the second turntable 5. Attached and adhered to a flat plane except near round the hole of the first turntable 3 is a frictional plate formed of a resilient materials such as rubber and the like materials. The first turntable 3 has a boss 34 which receives the shaft 21.

Figure 4A:
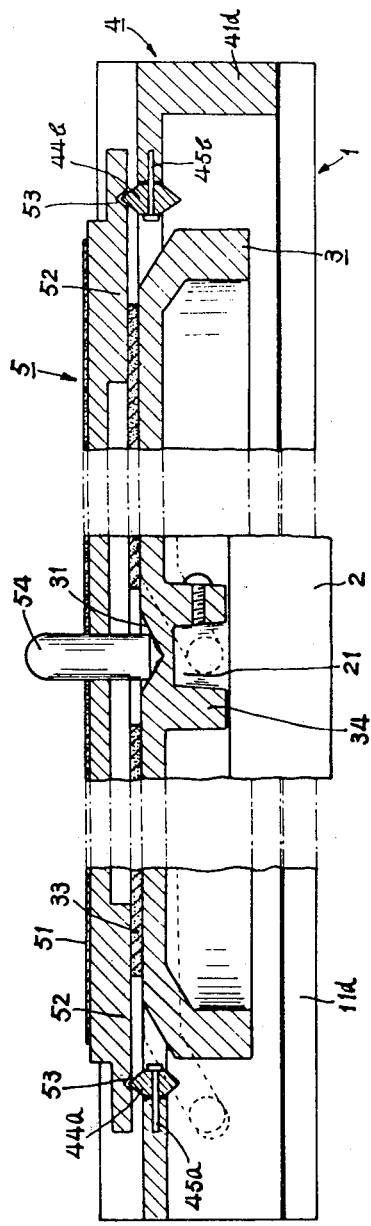

The supporting plate 4 is formed in a box shape, as shown in FIGS. 2 through 3(a),(b), and its side wall plates 41a, 41b are attached with supporting pins 42a–42d rolling wheels 43a–43d mated within the guide grooves 12a–12d, and its upper plate 41c is provided with a circular opening 43 having a diameter smaller than the diameter of the second turntable 3 discussed later in detail (but larger than that of the first table), and pulleys in diamond shape 44a, 44b(44c, 44d not shown) as shown in FIGS. 4(a),(b) are securely fixed on a plurality of places around the opening on the peripheral wall surface, with pins 45a, 45b.

FIGS. 4(a)–(e) show the second turntable 5, as comprising an annular auxiliary plate 52 on the upper surface of which is adhered a resilient sheet 51, i.e. a rubber sheet and at its lower surface V-shaped notches are provided along its entire periphery so that a part of the pulleys 44a–44d engages therewith. A center pin 54 extends downwardly from the second turntable and its end is formed in a conical shape with a 35° inclined angle, thereby mating within the hole 31 for engaging the center pin, at which time the first turntable 3 abuts the auxiliary plate 52 at its frictional plate 33, and the second table 5 rotates with the rotation of the main or first table 3.

An arm lifter and an arm are provided on the upper plate 41c and an operating lever, etc., are provided on the front wall plate 41d, although they are not shown in the drawings.

FIGS. 3(a),(b) show posts or ring walls for preventing an andue or undesired misoperation and/or malfunction.

The front loading type record player having a slidable turntable is designed as mentioned above, and its operation process which is one of the features of this invention will be now be discussed in detail referring to FIGS. 4(a)–(e) in which the second turntable 5 is uncoupled from the first table 3 and is drawn out of the player frame 1, whereby a record is placed and/or replaced on and/or from the second table.

FIG. 4(a) shows an in-play state, in which case, the pulleys 44a–44d partly rest within the groove 53 but do not directly abut against the groove side walls and hence, the rotary movement of the turntable by means of motor 2 is transmitted to the second table 5 though the frictional plate 33 and the first table also rotates with the second table without idling slip thereby permitting the record playing.

Figure 4B:
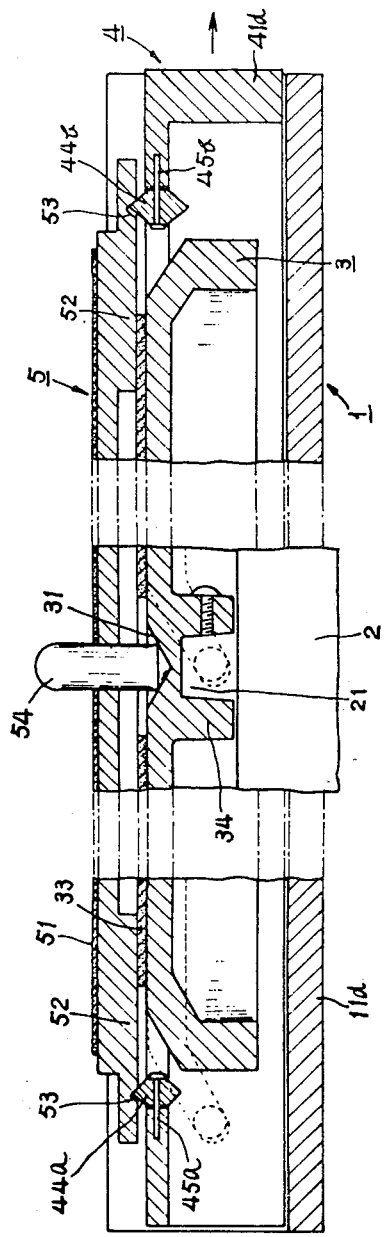

Upon termination of the revolution of the motor 2 after the record playing, the pulleys 44a–44d abut at first against the inclined wall surfaces of the groove 53, as shown in FIG. 4(b) and then causes the second turntable 5 to slidably move in a direction indicated by the arrow in FIG. 4(b) with the forward movement of the support plate 4. Then, the supporting plate 4 begins to rise upwardly owing to the shape of the guide grooves 12a–12d for 35° inclination and then upon the disengagement of the center pin from the engagement hole 31, sliding its slant surface off the latter, the second table 5 rests on the pulleys 44a–44d with its whole weight, as shown in FIG. 4(d), and the pulleys completely mate within the groove 53 thereby holding the second table 5. Upon the further drawing out of the second table forwardly, the second table 5 and the supporting plate are lifted up toward the maximum upper positions as shown in FIG. 4(e), and in turn moves horizontally and forwardly and then the both including the center pin 54 are drawn out from the player frame 1 in the direction of the arrow in FIG. 4(e) a position where the supporting pins 42a–42d abut against the ends of the guide grooves 12a, 12d, whereby one can replace or exchange the record for new one on the second table 5.

An opposite or reverse process after said process of replacing or exchanging of the record will permit the table to come back to the starting position in FIG. 4(a) through the process in the order shown in FIGS. 4(d),(c) and (b).

As mentioned above, this invention provides a placing or replacing of the record on the second table without opening the dustproof cover, and permits to place some articles on the cover and there is no need of opening the cover except at some special cases, i.e. disassembling etc., thereby permitting its location on the top of a high rack or highest shelf thereof and hence, releasing the user from his or her limited space location problem of the player, and providing a high operative location, by an arrangement of the record player of this invention comprising the first and the second turntables, the second table being slidably drawn-out forwardly from the first table and then from the player frame thereby permitting the front loading or unloading of the record thereon and therefrom.

The second embodiment comprises a driving means for feeding or ejecting the second table outwardly from the player frame.

The third embodiment comprises a front loading record player further comprising, in addition to the features of the second embodiment, a control means for translating the pickup arm, which permits holding the arm at a non-operative position prior to the movement of the second table and to bring the arm to an operative position(in-play) when the second table rests or is coupled on and with the first one.

The second and the third embodiments are essentially identical with the 4th–6th embodiments discussed later in detail except for the provision of a cover plate provided in front of an opening of the front plate of the player frame thereof in the latter embodiments, and the inventors attach FIG. 5 for showing the difference of the second embodiment from the latter embodiments and discuss the effects of the former hereunder.

The explanation of the fourth to sixth embodiments are incorporated and applied for the second and the third embodiments.

Parts shown with like numerals show like or equivalent elements in the 4th to 6th embodiments.

The second embodiment comprises a first turntable and a second table for placing a record thereon, detachable from the first table, and a driving control means for feeding the second table outwardly from the player frame, so that one can place or replace the record on and from the second table without opening the dustproof cover, hence, one can place some articles on the cover, and there is no need of placing the player on the higher portion or a top of the shelf of the rack which is tall, then, one can reduce its location space and can place the player at the best operating condition.

The third embodiment having the following features, comprises in addition to the second embodiment, a control means for translating the pickup arm of the record player, which permits a holding of the arm prior to the movement of the second table, and a bringing of the arm to the in-play position when the second table rests on the first table, so that the stacking of electronics devices on the player can be of course available, and various different records are automatically played, one by one, by exchanging them and protection of a stylus or the pickup is completely effected since its operative characteristics are highest and the undue misoperation is sufficiently prevented in its design.

Now, the 4th to 6th embodiments of this invention having a cover plate will be discussed hereunder.

FIGS. 6(a),(b) are perspective views showing the tables, wherein the second table is detached from the first one, and the second one is loaded on the first one.

FIG. 7 shows the player frame 101 having a direct-driving motor 102, and a first turntable 103 and other parts securely fixed thereto and having upper and front opening spaces. Provided along the side wall plates 111a,111b at both sides of the bottom plate 111d are pair of grooves 112a,112b each having slants of generally 45° at one end to lift up at a certain height the supporting plate 104 bearing the second turntable 105 discussed later, and then, to horizontally and slidably feed it along its lengthwise direction for a certain length, and provided thereafter are a pair of rails 112c,112d which run in parallel relative to the bottom plate 111d, toward the other end, and provided on the supporting plate 104 are, at the side wall plates 141a,141b, sleigh-like shaped racks 141A,141B, horizontal rails 141C,141D and guide grooves 141E,141E, as shown in FIG. 8(a). In addition, provided on the side plates 111C is a transparent and/or translucent plastic dustproof cover 113, by means of hinges 114a,114b.

The player frame 101 is also mounted with its bottom plate 111d, a direct-driving motor 102, a motor control circuit, an r.p.m. detector circuit and other circuits which are not shown. Formed at a center of the first table is a center pin engagement hole 131 of conical shape having an inclined angle of 45° into which the center pin of the second table is inserted, and attached on the flat plane except for the near portion around the center pin hole is the first table 103 through a boss 134.

The supporting plate 104 is shaped in a flat box shape as shown in FIG. 7 and provided symmetrically at both front sides of the player frame bottom plate 111d are driving gears 143a,143b and rotary wheels 143c,143d which are respectively engaged with the sleigh-like racks 141A,141B provided with resilient members such as rubber and the like materials at their peripheries, and rails 143a,143b provided on the side wall plates 141a,141b, through a rod 143e.

Formed on an upper plate 141C of the supporting plate 104 is a circular opening having its diameter smaller than that of the second table later discussed (but larger than that of the first table 103), around the peripheral wall of which is provided a step 104B so as to restrict the position of the second table 105 and to prevent if from dropping therefrom, respectively.

Furthermore, provided at a rear portion of the supporting plate 104 are rolling wheels 145 rolling along on the rails 112c,112d. Formed on the side wall plates 141a,141b are guide grooves 141E,141F intowhich rollers R on the player frame side engage.

The second table 105 is, at its upper surface, adhered with a resilient sheet 151 (such as a rubber or any other equivalent or like materials), and at its lower surface, with V-shaped projections around the entire periphery which engage with V-shaped grooves formed on the stair 104B so as to prevent an undue and unexpected movement of the second table. The center pin 152 also extends downwardly from the second table and its lower end 152A is shaped conically with an inclination of 45° and mates within the center pin engaging hole 131 thereby providing a centering. The first turntable 103 is designed so that its frictional plate 133 abuts against the lower surface of the second table 105 which is in turn rotated with rotation of the first table 103.

An arm lifter 106 is provided on an upper plate 101A of the player frame 101, and operating levers and operating buttons, etc., are provided on the front plate.

A clutch mechanism associated with the driving gears 143a, 143b and the rotating wheels 143c, 143d will be discussed with reference to FIGS. 8(b), (c).

At first, the gears 143a(143b) and the rollers 143a(143b) are concentrically secured with the rod 143e, respectively so as to rotate together therewith.

The gear 143a meshes with a small diameter gear $G_1$ through the clutch mechanism C comprising a spring S provided at an angle member A and clutch disks $d_1$, $d_2$, and provided on the peripheral teeth of the clutch disk $d_1$ via the gears $G_2$, $G_3$ is a belt pulley P, which is linked with a loading motor (a driving motor for the supporting plate 104) through a belt B.

A tonearm 107 is designed such that it automatically starts by means of the tonearm driving motor discussed later from the out-play position where the arm is held on an arm rest 106A, and to a position of a first audio groove of the record, i.e. the outermost peripheral groove and it follows the grooves to the final one, i.e. the innermost groove, and automatically returns therefrom to the starting rest position on the arm rest 106A.

FIG. 7(c) shows a front cover plate 108 which closes and opens an opening 111f provided in front of a front plate 111e of the player frame 101 which is necessary for feeding the second table 105 and supporting frame 104 from the player frame at the time of the record play and non-play. The cover plate is provided with a swingarm 181 which is pivotally connected with a projection 182 by means of a supporting arm 183 provided within a notch 111g formed at a corner in FIGS. 10–11(a), (c). Pivotted at the other end of the swingarm is one end of the crucial cover plate mounting member 184 mounted with a cover member 185 so as to rotate only in a clockwise direction with a projection 184C and pivotably provided at its other end is a roller 186 to be mated within a groove 146 formed at the bottom surface of the supporting plate 104. Also springs 187a, 187b are connected between a projection arm 181a protrudely provided at a side slightly near from the center of the swingarm 181, a spring connecting arm piece 184b extending opposite to a cover member mounting piece 184a of the cover plate mounting member 184 and the bottom plate 111d. To this end, the spring 187b is formed to have a weaker energy and repulsive strength, in comparison with the spring 187a. The mechanisms are formed respectively at both ends of the opening 111f of the front plate 111e.

The cover plate member 108 has the swingarm 181 and the cover plate attaching member 184, both of which are inclined leftwardly at the time of the closing, and upon opening of the cover plate, the cover plate attaching member 184 rotates with the linkarm 181 against the stored energy of the spring 187b until it abuts against the front plate 111e, and then, a roller 186 disengages from the notch 146 due to a rise of the supporting plate 104 and it furthermore abuts against the lower surface of the side wall plates 141a, 141b of the supporting plate 104 due to the forward movement of the supporting plate 104, and the cover plate attaching member 184 rotates in counterclockwise direction about a pivot axis 188 against the stored energy of the spring 187a due to the selfweight and the forward slide movement of the support plate 104, thereby opening the cover plate 185. Thus, a record placed or loaded on the second table 105 can be exchanged for a new one, but at this moment, as the front opening 111a is shaped in arcuate or an arch-like shape, a centering of the record with respect to a spindle is easily accomplished by following the arcuate periphery by the new record at its periphery. When the supporting plate 104 returns again into the player frame 101, it slides to and fro above the roller 186, which in turn comes into the notch 146, whereby the cover plate attaching member 184 rotates owing to the resilient power of the spring 187a in a counterclockwise direction, and the member 184 and the swingarm 181 are both rotated and inclined and finally the cover plate 185 closes the opening 113A of the dust cover 113.

The means for controlling the operation of the loading motor and the tonearm driving motor will now be discussed referring to FIG. 12.

Figure 9E:
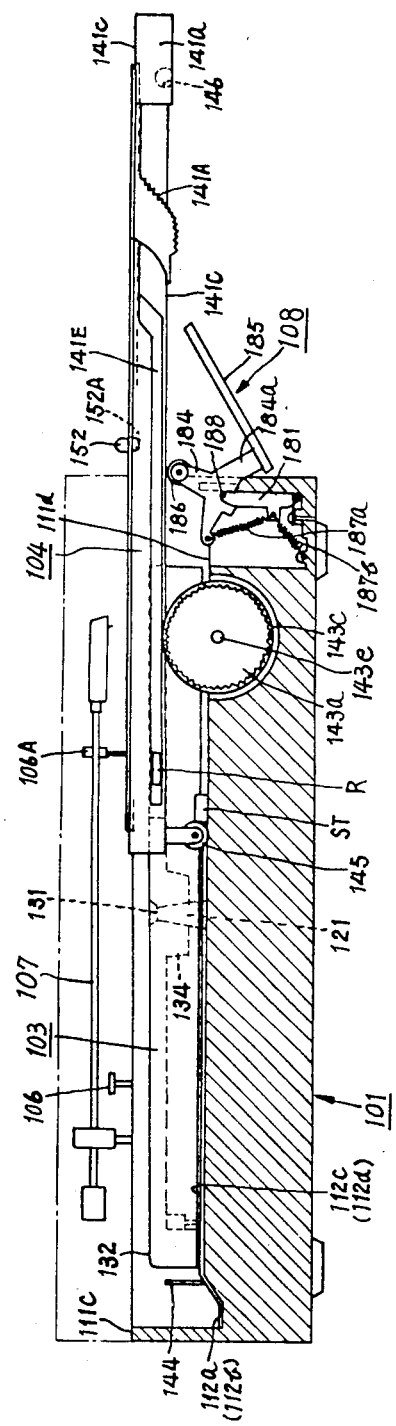

FIG. 12 shows an eject switch $S_o$ for supplying an output power from its output terminal $t_o$ by operating an eject button (not shown) for feeding the supporting plate 104 outwardly from the player frame 101 as shown in FIGS. 6(a) and 9(e) and a loading-out switch $S_1$ (for example, a switch provided relative to a stopper ST) for supplying an output power from its second terminal $t_{12}$ when the supporting plate 104 has been finally fed to its outward maximum distance, and for supplying other output from its other terminal $t_{11}$ when the supporting plate 104 is fed back inwardly into the player frame 101 slightly from the maximum forward distance or when the operating button is operated, so that the supporting plate 104 is to be loaded again into the player frame 101, a loading switch $S_2$ (i.e. a switch provided relative to a pin 144 engaging with the supporting plate) for supplying an output from its output terminal $t_2$ when the player is to be in-play when the second table 105 is coupled with the first table thereon as a result of the loading of the supporting plate 104 within the player frame, a tonearm switch $S_3$ (not shown as this is a known construction) for supplying an output from its first terminal $t_{31}$ when the tonearm 107 is held on the armrest 106A and in out-play state, and also supplying its output power from its other terminal $t_{32}$ when the tonearm is not held on the armrest 106A at the in-play state, a starting switch $S_4$ (a switch provided relative to the starting button which is not shown) for supplying an order signal for starting the record play and for supplying its output power from its output terminal $t_4$, and switches $S_5$, $S_6$ for supplying output power from their output terminals $t_5$, $t_6$, respectively when the stylus reaches the outermost peripheral audio groove and at the innermost audio groove respectively, wherein each of the switches are positioned at the convenient positions.

An eject memory, a loading memory, an automatic starting memory, an automatic return memory and a control memory are shown by the symbols $M_1$—$M_5$, respectively, and the Figure further shows a loading motor LM, a driving control circuit $L_1$ for the loading motor TM, a driving circuit $L_2$ for the loading motor, a tonearm driving motor, a tonearm driving circuit T, a signal setting control circuit CS for controlling the setting signals of the automatic memory $M_3$ and a logic OR circuit, and those are connected as shown in FIG. 12.

The player of this invention is thus constructed and one of the features of its operation processes will be now discussed hereunder, wherein the first and the second tables are uncoupled, then the second table is outwardly fed from the player frame so as to place a record thereon, and the second table outside of the frame is fed into the player frame so as to be coupled with the first table.

FIGS. 6(a) and 9(e) show the non-play state and also the cover plate 185 being fed outwardly from the player frame 101 in open state, i.e., the record being placed or replaced on the turntable on the supporting plate 104 outwardly fed from the player frame front 101. Upon a slight feedback, of the supporting plate inwardly or an operation for giving an order of the loading of the plate 104 at the in-play position into the player frame 101, the loading-out switch $S_1$ supplies from its first output terminal $t_{11}$ its output, which sets the loading memory $M_2$, its output of which is supplied into second terminal $tm_2$ of the loading motor driving control circuit $L_1$, another output of $M_2$ is supplied to the loading motor LM through the loading motor driving circuit L based on the former input to a second terminal $tm_2$, such input causing the loading motor LM to rotate and hence to drive the rotary wheels 143c(143d) and the gears 143a(143b) through the belt B, the belt-pulley P, the gears $G_1$, $G_2$, $G_3$ (in FIG. 8) and the clutch mechanism. The engagement or meshing of these rotary wheels and the gears and the rails 141C(141D) provided on the support plate 104, and the sleigh-like shaped racks 141A (141B) cause the supporting plate 104 to be fed back inwardly into the player frame 101, in the order illustraed in FIGS. 9(e)-(a).

At this moment, rollers 145 provided at rear of the supporting plate 104 slidably rolls along the rails 112c(112d) provided on both side wall plates of the sides of the player frame, and other rollers provided on the side wall plates of the player frame engage into the guide grooves 141E (141F), and each of them permits an easy and sure guide of the supporting plate 104 inwardly into the player frame.

Inspite of the above mode of loading of the supporting plate 104 into the player frame 101, the loading of the plate 104 is blocked when the tonearm 107 is released from the armrest 106A and resides in the inplay position, i.e. in the path of the loading of the plate 104 even if the setting signals are applied to the loading memory $M_2$ and the tonearm 107 is held at the armrest 106A to the last and when the arm is brought to the outside of the loading path of the plate 104 the loading memory is designed to supply its output power in response to the input of the setting signals. This is discussed referring to FIG. 12. wherein the tonearm 107 is out of the rest, the tonearm switch $S_3$ supplies from its second output terminal $t_{32}$ the output, which sets the control memory $M_5$, which feeds its output control signals to the motor driving control circuit $L_1$, which terminates its supply of electric power to the loading motor.

Upon holding of the tonearm 107 at the armrest 106A, the tonearm switch $S_3$ feeds from its first output terminal $t_{31}$ its output, which resets the control memory $M_5$, which terminates its supply of the control signals to the loading motor control circuit $L_1$ and consequently, supplies the electric power to the loading motor LM in response to the output power of the loading motor.

Then, the supporting motor plate 104 is slidably loaded into the frame 101 according to the above mode and then is set at the in-play position, as shown in FIG. 9(a). At this moment, the rollers 45 mounted at the of the frame 101, slidably rolls along the rails 112c(112d), and then come into the grooves 112a (112), and the sleigh-like shaped racks 141A (141B) mesh with the gears 143a(143b) and descend at 45° due to their shapes per se, and the center pin 152 of the second table 105 at its lower end 152A slides and/or comes closer at its lower end along a slant surface of the engagement hole 131 and engages therein.

A centering of the second table with the first table is correctly assured by a connection of both of the conical parts of the lower end 152A of the center pin and the slant surface of 45° of the center pin to the second table 105 through the frictional plate 133, there by rotating the latter without any slip.

Upon arrival of the support plate 104 at the in-play position, as shown in FIG. 9(a), the cover plate 185 closes with the action of the before-mentioned mechanism and the loading switch $S_2$ detects its arrival and feeds its output. Said output of the $S_2$ resets the loading memory $M_2$, which cuts-off or interrupts its power supply to the loading motor LM, which terminates the loading-in operation of the plate 104. The output of $S_2$ controls the setting signal control circuit CS intermediately connected in the path of the setting signal input of the automatic starting memory $M_3$ simultaneously is controlled to permit supply of its output signal to the setting input terminal of the starting switch $S_4$ for supplying the automatic starting signals of the record player.

Accordingly, the countermeasure for preventing the misoperation is provided such that the loading motor never stops even when the supporting plate 104 has not yet been at its complete loading position for in-play and also is not in-play state, and the tonearm 107 has not come out from the armrest 106A to its in-play position even when the user erroneously pushes the automatic starting switch $S_4$.

The loading switch $S_2$ feeds its output to the starting switch $S_4$ which feeds its output which sets the automatic starting memory $M_3$, which feeds its output, which is applied to a first input terminal $tm_3$ of the tonearm driving circuit which feeds its output to the tonearm driving motor TM, which detaches the tonearm 107 from its armrest 106A and brings its stylus to the first outermost audio groove (starting groove) through the tonearm driving mechanism (not shown) and therefore, the stylus descends onto the audio groove for in-play.

Upon arrival of the tonearm at its in-play starting position (a position at an outermost peripheral audio groove), the detector switch $S_5$ feeds its output, which resets the automatic starting memory $M_3$, which stops the feed of its output to the motor TM, thereby terminating displacement of the arm 7.

Upon terminating of the record play the detector switch $S_6$ detects the tonearm position 107 (a position of the innermost audio groove of the record) and feeds its output signals, which set, through the logic summing circuit OR, the automatic return memory $M_4$, which feeds its output, which is applied to another terminal $tm_4$ of the tonearm driving circuit T, which causes the tonearm driving motor TM to rotate in a direction in opposite to the direction of the operation of the starting playing abovementioned, said rotation of which lifts up the known tonearm mechanism (not shown), and hence, the stylus, and brings back the arm to the rest arm 107 to hold it, at which moment, the arm switch detects it and feeds from its first output terminal $t_{31}$ its output signals, which reset the automatic return memory $M_4$ and then stops the arm driving motor.

The operation for outwardly ejecting the plate 104 during the in-play and/or a post play will be now discussed hereunder.

Operation of an eject button (not shown) causes the eject switch to feed its output signals, which set an eject memory $M_1$, which feeds its output signals which is applied to a first input terminal $tm_1$ of the loading motor driving control circuit $L_1$ which is controlled with the output of the control memory $M_5$, which is set with the output signals supplied from the output terminal $t_{32}$ of the tonearm switch $S_3$, since the tone arm 107 is not held on the armrest 106A while the record is in-play, and said driving control circuit $L_1$ does not feed its electric power to the loading motor LM.

The eject switch $S_o$, simultaneously, through the logic OR circuit, feeds its output, which sets the automatic return memory $M_4$, which feeds its output which is supplied to another input terminal $tm_4$ of the tone arm driving circuit T, which in turn drives the arm driving circuit TM in the same direction as the time of the termination of the record play mentioned above, said rotation of which in turn lifts up the arm with its stylus from the record face and carries back it toward the armrest to be re-held thereon.

Upon complete return of the arm 107, to the armrest 106A, the tone-arm switch $S_3$ detects it and feeds its output signals, which re-set the memory $M_4$ which in turn stops the arm driving motor, and the output of the switch $S_3$ also re-sets the circuit $L_1$, which receives a command signal from the eject memory $M_1$ and rotates the loading motor LM through the circuit $L_2$, in a direction opposite to the driving direction of the plate 104 at loading-in of the plate 104 into the frame 101.

When the record play has finished and the arm 107 has already been held on the armrest 106A, the output of the eject switch causes the eject memory $M_1$ to supply its output, which drives the loading motor in said eject direction.

The drive of the loading motor LM by the eject operation drives the gears 143a(143b) and the rollers 143c 143d through said gears and the clutch mechanism, and a reverse operation opposite to said loading-in operation of the supporting plate 104 into the frame 101, realizes the mesh and engagement of the rollers and the sleigh-like shaped racks 141A, 141B, the rails provided on the plate 104, thereby to slidably feed or eject the plate 104 outside of the frame 101 (in the direction of the arrow shown in FIG. 9(a)).

At this moment, the horizontal slidable outwardly movement of the plate 104 from the frame 101 is terminated with a stopper ST provided on the frame side 101, and simultaneously thereupon, the loading switch $S_1$ detects said arrival of the plate 104 to the outermost or frontmost position and feeds its output signals from its output terminal $t_{12}$, which resets the eject memory $M_1$, which in turn stops the motor drive and terminates the ejection operation.

The outwardly fed support plate 104 from the frame 101 should be, as shown in FIG. 6(a) or 9(e), fed to a position outside in front of the frame to permit a replacement or an exchange of the record from and/or on the second talbe 105 mounted on the plate 104, which has been fed outwardly from the frame 101 after the front cover plate 185 which closed the opening 111f of the front plate 111e has automatically opened.

FIGS. 6(a) and/or 9(e) show a state where the plate 104 has been outwardly fed from the frame 101 such that the center pin 152 of the second table 105 conveniently comes out from the frame 101. The above design of the record player in which the first and the second tables are coupled or uncoupled to each other so that the plate 104 is fed outwardly from the frame 101 or inwardly thereinto, is also evenly designed to be usable the same as the conventional type player by arranging the dustproof cover 113 which can be opened about the pivoted hinges 114a, 11b, upwardly, at a state where both the first and the second tables are coupled, as shown in FIG. 6(b) or FIG. 9(a).

As mentioned above, each of embodiments concerning the record player comprises a first and a second table which can be uncouplable and for placing a record on the latter, a driving control means for feeding and/or ejecting said second table outwardly from the player frame, so that a replacing or exchanging of the record is available without opening the dustproof cover, and there is no need of opening of said cover except for some special situation, hence, no need of using high and tall racks nor locating the player in high racks at the top of the shelf, hence a very limited and reduced space is enough for locating it, which is indispensable to utilized the reduced space for other purposes. A higher operative location is available, there is provision for automatically opening and closing the front cover plate in front of the opening provided in the front plate of the player frame during the slidable outward and inward movement of the supporting which gives an aesthetic view on the front side of the player and also prevents an intrusion of foreign articles and particles therein more than the conventional one having an open front opening, and no direct external force is imparted to said front cover plate during its open and close operation thereby prevent it from being damaged, and arch-like or arcuate shapes from at the upper postions of the opening and the front plate permit an easy centering of a record when it is placed on the second table, by slidably following the outer periphery of the record along said arcuate portions.

We claim:

1. A front loading type record player comprising a frame, a first turntable rotatably disposed on said frame, a support means slidably mounted on said frame, said support means being slidable between a playing position located in the frame and a loading position extending outwardly of the frame, and a second turntable carried on said support means, said second turntable receiving a record when said support means is in said loading position, said second turntable being transferred to and supported by said first turntable when said support means is in said playing position, whereby the first and second turntables rotate as a unit during playing of the record.

2. A front loading type record player according to claim 1 further comprising lowering and elevating means for lowering and elevating said support means as said support means enters and exits from said playing position, whereby said support means lowers said second turntable to deposit said second turntable on said first turntable as said support means enters said playing position and elevates said second turntable from said first turntables as said support means exits from said playing position, said second turntable being carried by said support means as the latter slides from said playing position to said loading position.

3. A front loading type record player according to claim 1, further comprising motorized driving means for moving the support means between said playing position and said loading position.

4. A front loading type record player according to claim 3, further comprising a cover mounted on said player in front of said support means and movable between a closed position in the path of movement of said support means and an open position outside the path of movement of said support means, and actuating means for moving said cover between said open and closed positions in accordance with the slidable movement of said support means by said driving means.

5. A front loading type record player according to claim 1, in which said support means comprises an opening having a diameter which is smaller than that of said second turntable, said second turntable being disposed in the center of said opening, and mounting means for mounting said second turntable on said support means along the peripheral edge portion of said opening in said support means when said support means is in said load position.

6. A front loading type record player according to claim 5, wherein said mounting means comprises rotatably mounted roller elements.

7. A front loading type record player according to claim 5, in which the diameter of said first turntable is smaller than the diameter of said opening in said support means so that when said support means is located in said playing position, said second turntable is no longer mounted on said support means by said mounting means and said second turntable is disposed on and directly engaged with said first turntable through said opening to be rotatable together with said first turntable.

8. A front loading type record player according to claim 7, in which said second turntable comprises a center pin extending downwardly from the center thereof, and said first turntable comprises a depression in the center of the upper portion of the first turntable and a frictional plate on the upper surface thereof, whereby when said support means is in said playing position, said second turntable is located on the first turntable in the center thereof by said center pin engaging said depression and is frictionally engaged with said first turntable by means of said frictional plate.

9. A front loading type record player according to claim 1, further comprising a tonearm means on said frame and having a cartridge for picking up sound from a record on the turntable.

10. A front loading type record player according to claim 9, further comprising control means for controlling said tonearm means, said control means actuating said tonearm means to hold the latter in a non-operative position when said second turntable is out of said playing position, to bring said tonearm means to an in-play position when said second turntable is in said playing position, and to return said tonearm means to said non-operative position after playing at the in-play position.

11. A front loading type record player according to claim 10, further comprising motorized driving means for moving said support means between said playing position and said loading position, a front cover attached to said frame, and operable means for opening and closing said front cover in accordance with the movement of said support means by said driving means.

12. A front loading type record player according to claim 1, further comprising a cover mounted on said frame, said cover having an opening, a front plate, pivotal means pivotably mounting said front plate on said frame between a closed position wherein said front plate is disposed over said opening and an open position wherein said cover is displaced from said opening and is also out of the slidable path of movement of said support means, said pivotal means comprising a lever operable by the sliding movement of said support means for actuating said pivotal means to thereby effect pivotal movement of said front plate such that said front plate is in said closed position when said support means is in said playing position and said front plate is moved to said open position when said support means is moved from said playing position.

13. A front loading type record player according to claim 3, wherein said motorized driving means comprises means for elevating said support means as the latter moves out of said playing position to thereby lift said second turntable off of said first turntable and for lowering said support means as the latter enters said playing position to thereby deposit said second turntable on said first turntable, whereby when said support means is in said playing position, said second turntable is unsupported by said support means.

14. A front loading type record player according to claim 13, wherein said motorized driving means comprises motor driven gear means mounted on said frame, said support means having rack means engageable by said gear means whereby said motor driven gear means slidably moves said support means.

15. A front loading type record player according to claim 14, wherein said rack means has an incline which provides for maintaining engagement between said gear means and said rack means as said support means is raised and lowered as said support means leaves and enters respectively said playing position.

16. A front loading type record player according to claim 14, wherein said means for elevating and lowering said support means comprises rollers on said support means and grooves having inclines on said frame, said rollers passing over said incline into said groove as said support means enters said playing position to thereby provide for lowering of said support means and passing from said groove onto said incline as said support means leaves said playing position to thereby provide for raising of said support means.

17. A front loading type record player according to claim 4 wherein said cover has at least a partial arcuate configuration.

* * * * *

UNITED STATES PATENT AND TRADEMARK OFFICE
CERTIFICATE OF CORRECTION

PATENT NO. : 4,337,533
DATED : June 29, 1982
INVENTOR(S) : Ryuta ANDO and Kazumi KINUGAWA It is certified that error appears in the above-identified patent and that said Letters Patent are hereby corrected as shown below:

On the title page,

Under "Foreign Application Priority Data", include the following:

Oct. 5, 1979 [JP] Japan......54-128597

Signed and Sealed this

*Second* Day of *November 1982*

|SEAL|

*Attest:*

GERALD J. MOSSINGHOFF

*Attesting Officer*     *Commissioner of Patents and Trademarks*

UNITED STATES PATENT AND TRADEMARK OFFICE
CERTIFICATE OF CORRECTION

PATENT NO. : 4,337,533
DATED : June 29, 1982
INVENTOR(S) : Ryuta ANDO and Kazumi KINUGAWA It is certified that error appears in the above-identified patent and that said Letters Patent are hereby corrected as shown below:

ON THE TITLE PAGE,
　　Correct the assignee's name from "Kabushiki Kaisha Aiwa" to -- Aiwa Kabushiki Kaisha --.

Signed and Sealed this

First Day of March 1983

[SEAL]

Attest:

GERALD J. MOSSINGHOFF

*Attesting Officer*　　*Commissioner of Patents and Trademarks*